United States Patent [19]

Lumelsky et al.

[11] Patent Number: 5,351,067
[45] Date of Patent: Sep. 27, 1994

[54] MULTI-SOURCE IMAGE REAL TIME MIXING AND ANTI-ALIASING

[75] Inventors: Leon Lumelsky, Stamford, Conn.; Sung M. Choi, White Plains, N.Y.; Alan W. Peevers, Berkeley, Calif.; John L. Pittas, Bethel, Conn.

[73] Assignee: International Business Machines Corporation, Armonk, N.Y.

[21] Appl. No.: 733,766

[22] Filed: Jul. 22, 1991

[51] Int. Cl.⁵ .............................. G09G 1/02; G09G 1/06
[52] U.S. Cl. .................................... 345/191; 345/113; 345/199; 345/200
[58] Field of Search ............... 340/799, 721, 728, 734, 340/703; 395/154, 158, 160, 164, 165; 345/113, 185, 191, 139, 150, 201, 116, 199, 200

[56] References Cited

U.S. PATENT DOCUMENTS

| | | | |
|---|---|---|---|
| 4,357,624 | 11/1982 | Greenberg | 358/22 |
| 4,599,611 | 7/1986 | Bowker et al. | 345/113 |
| 4,653,020 | 3/1987 | Cheselka et al. | |
| 4,682,297 | 7/1987 | Iwami | 340/734 |
| 4,684,990 | 8/1987 | Oxley | |
| 4,691,295 | 9/1987 | Erwin et al. | |
| 4,692,880 | 9/1987 | Merz et al. | 345/185 |
| 4,717,951 | 1/1988 | Fling | |
| 4,727,365 | 2/1988 | Bunker et al. | 345/139 |
| 4,742,474 | 5/1988 | Knierim | |
| 4,769,762 | 9/1988 | Tsujido | |
| 4,772,881 | 9/1988 | Hannah | |
| 4,855,831 | 8/1989 | Miyamoto et al. | 345/113 |
| 4,857,901 | 8/1989 | Lathrup | 345/201 |
| 4,951,229 | 8/1990 | DiNicola et al. | |
| 4,954,819 | 9/1990 | Watkins | |
| 4,956,640 | 9/1990 | Jundanian et al. | 340/799 |
| 4,994,912 | 2/1991 | Lumelsky et al. | 358/140 |
| 5,001,469 | 3/1991 | Pappas et al. | 340/721 |
| 5,065,231 | 11/1991 | Greaves et al. | 345/113 |
| 5,119,080 | 6/1992 | Kajimoto et al. | 340/799 |
| 5,124,688 | 6/1992 | Rumball | 340/703 |
| 5,128,658 | 7/1992 | Pappas et al. | 340/703 |
| 5,138,307 | 8/1992 | Tatsumi | 340/721 |
| 5,140,315 | 8/1992 | Edelson et al. | 345/150 |
| 5,185,858 | 2/1993 | Emery et al. | 395/158 |

FOREIGN PATENT DOCUMENTS

| | | |
|---|---|---|
| 0160549A3 | 11/1985 | European Pat. Off. |
| 0236943A2 | 9/1987 | European Pat. Off. |
| 2640837 | 6/1990 | France |
| 2238214A | 5/1991 | United Kingdom |

Primary Examiner—Alvin E. Oberley
Assistant Examiner—Steven J. Saras
Attorney, Agent, or Firm—Perman & Green

[57] ABSTRACT

Method and apparatus for implementing a raster graphic display video data path that provides arbitrary mixing of a plurality of images. The video data path is highly parallelized, and employs parallel devices operating under the control of a set of look-up tables. The look-up tables are loadable from a controller, such as a host workstation. The raster graphic display video data path functions with unlimited screen resolutions, and also enables a variety of different pixel data formats from a potentially large number of different sources. Outputs from several image sources are mixed under the control of the host workstation, with a resultant pixel value being based on (a) a combined translucency coefficient (alpha) of the images, for each image source, and (b) a window identification number assigned by the host workstation. Pixel value conversion to a common predetermined format provides coherency between pixel values generated by a number of different image sources, such as HDTV and graphics servers. A separate frame buffer is allocated for each of the sources.

18 Claims, 5 Drawing Sheets

N X M CONFIGURATION

MULTI-SOURCE IMAGE REAL TIME MIXING AND ANTI-ALIASING

CROSS REFERENCE TO RELATED PATENT APPLICATIONS

This patent application is related to the following commonly assigned U.S. patent applications: Ser. No. 07/733,576, filed Jul. 22, 1991, entitled "Look-Up Table Based Gamma and Inverse Gamma Correction for High-Resolution Frame Buffers" S. Choi et al.; and Ser. No. 07/733,950, filed Jul. 22, 1991, filed entitled "High Definition Multimedia Display" S. Choi et al.

FIELD OF THE INVENTION

This invention relates generally to image display apparatus and method and, in particular, to the simultaneous display of images from a plurality of image sources.

BACKGROUND OF THE INVENTION

In a modern display system data from multiple image sources are displayed. These images are shown on the display using a "window", a technique in which an area of a display is assigned to an image source. However, problems arise when the outputs from multiple sources must be coordinated on the display. When there is more than one source for the display, a mechanism is required to coordinate the output to a single display monitor.

A straightforward solution is to design the system such that only one source can be displayed at a time. For example, if a High Definition Televisions (HDTV) sampler input is selected, then only the HDTV output is output to the display. However, with an increased demand for "windowing" in graphics systems, and with an increased emphasis on a multimedia environment, where there exists more than one video source, this relatively simple solution is not adequate.

In order to accomplish windowing there must be provided a mechanism such that, within the total area defined by a monitor screen, different sub-areas are sourced by different video sources. FIG. 1 shows an example of a windowed graphics monitor screen. Area A may be sourced by a local host or workstation. Area B may be sourced by a remote graphics server connected via a high speed network. Area C may be sourced by a HDTV sampler. One technique to provide such a display is known in the art as pixel switching. That is, for a given display area, or window, the source of pixels for that area is selected from a specified image plane.

A more complex problem is presented when an arbitrarily shaped image from a source is overlayed on top of another image, rather than over a simple rectangular window. For example, an image of an automobile may be rendered using a graphics server, and the automobile image may be required to be overlayed upon a HDTV-generated background image. This requires that all pixel selection be accomplished on a pixel-by-pixel basis, since the shape of the foreground object, or automobile, is not rectangular.

One solution that is applicable to a two-image source system utilizes color keyed pixel switching, and allows pixel-by-pixel selection between two sources. This technique is described in commonly assigned U.S. Pat. No. 4,994,912, entitled "Audio Visual Interactive Display", by L. Lumelsky et. al.

However, for the case where there are more than two video sources, such as is illustrated in FIG. 1, a different solution is required for displaying N, where (N>2), image sources on a pixel-by-pixel basis.

Another problem that arises in overlaying arbitrarily shaped multiple source images is due to an aliasing effect resulting from image pixel switching. In that a pixel of one image source may not blend with a pixel from a second image source, aliasing results. Aliasing causes the resultant image to exhibit undesirable artifacts along the boundary between the foreground and the background images, such as stair-casing and color distortion. In order to eliminate the artifacts, an anti-aliasing technique is necessary. However, in that the foreground image does not contain information about the background image, the anti-aliasing should be accomplished in real-time at the video output. Thus, a technique for anti-aliasing N image sources in real-time is required. Furthermore, in order to anti-alias an arbitrarily shaped foreground object, the anti-aliasing must be accomplished on a pixel-by-pixel basis.

However, in modern high resolution displays the video data bandwidth and data rates are very high, thus placing severe timing constraints on any pixel processing that is to be accomplished in a real-time manner.

In U.S. Pat. No. 5,001,469, issued Mar. 19, 1991, entitled "Window-Dependent Buffer Selection" to Pappas et al. there is described window control hardware in a graphics sub-system in which multiple image sources are shown on to a single monitor. This is accomplished by defining each window as a separate frame buffer and defining for each window, i.e. frame buffer, a window identification, and a window size and location based on four values of top location, bottom location, left location, and right location. This system also employs a prioritizing scheme where N frame buffers ("windows") are prioritized from 0 to N-1, where 0 has the highest priority and N-1 has the lowest priority. The graphics sub-system includes N window detection logics, one for each frame buffer, which use comparators for window size and location values to determine if the associated window is active for a region of the screen. If the window is active an image source pointer and other information are sent to prioritizing logic which prioritizes N input signals to determine which "active" image source has a highest priority. An active image with the highest priority is chosen by the priority logic and shown on a monitor.

Pappas et. al. employ window size and location values to control multiple image sources, and an image frame buffer does not contain multiple windows. Furthermore, this system appears to be limited for use with only rectangularly shaped windows. Also, the problem of displaying multiple sources with differing image formats is not addressed.

It is thus one object of the invention to provide for the simultaneous display of video data from N independent image sources, where N may be greater than two, through the use of pixel switching and control on a pixel-by-pixel basis for the N image sources.

It is another object of the invention to provide a method and apparatus for displaying video data from a plurality of image sources on a monitor using a combination of alpha mixing and pixel switching, on a pixel-by-pixel basis, based on pixel color keying and window identification.

SUMMARY OF THE INVENTION

The foregoing and other problems are overcome and the objects of the invention are realized by method and apparatus for implementing a raster graphic display video data path that provides arbitrary mixing of a plurality of images. The video data path is highly parallelized, and employs parallel devices operating under the control of a set of look-up tables. The look-up tables are loadable from a controller, such as a host workstation. The raster graphic display video data path functions with unlimited screen resolutions, and also enables a variety of different pixel data formats from a potentially large number of different sources. Outputs from many image sources are mixed under the control of the host workstation, with pixel accuracy being based on (a) a combined transparency coefficient (alpha) of the images, for each image source, and (b) a window identification number assigned by the host workstation.

Pixel data format conversion to a common predetermined format provides coherency between pixel values generated by a number of different image sources, such as HDTV and high resolution graphics servers, such as a supercomputer.

An anti-aliasing function is disclosed for use in eliminating artifacts between a foreground image's boundary with a background image. The anti-aliasing function may also be used for generating special effects, such as showing a translucent image foreground from one source on top of a background image from another source. The preferred anti-aliasing approach employs pixel mixing.

In order to allow any number of independent video sources, a separate frame buffer is allocated for each of the sources. Thus, for a system with N separate video data sources, there are N frame buffers. Depending on display monitor bandwidth requirements, each of the N frame buffers may also be interleaved M ways.

The invention also pertains to an integrated circuit device that provides, in a high speed pipelined manner, a pixel mixing function and a pixel multiplexing function.

BRIEF DESCRIPTION OF THE DRAWING

The above set forth and other features of the invention are made more apparent in the ensuing Detailed Description of the Invention, when read in conjunction with the attached Drawing, wherein.

DETAILED DESCRIPTION OF THE INVENTION

Figure 2:
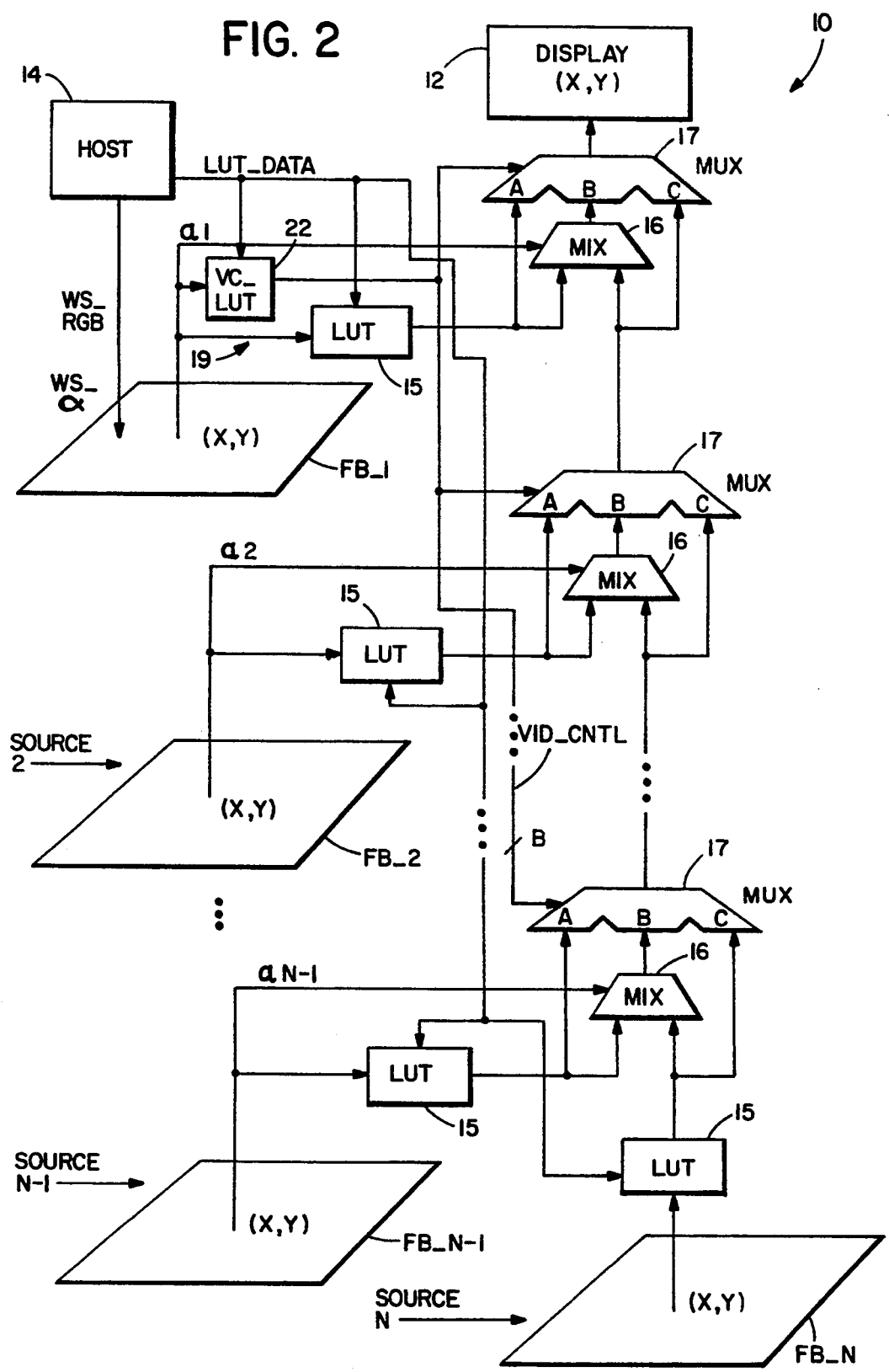
FIG. 2 is a block diagram showing, in accordance with the invention, a plurality of hierarchically arranged frame buffers having look-up tables, pixel mixing, and pixel multiplexing circuitry interposed between frame buffers.

Referring to FIG. 2 there is illustrated a block diagram of a multi-source video display pixel mixing system 10 that is constructed and operated in accordance with the invention. System 10 receives video data input from N sources, with each source having an associated frame buffer (FB) memory (FB_1 to FB_N). Also shown is a video output data path for a pixel (x,y) of each FB. In that there are N overlay FBs, there are N overlay pixels for a pixel displayed at display 12 location (x,y), one from each FB. The FBs are hierarchically ordered from 1 to N, where 1 is considered to have a highest priority and where N is considered to have a lowest priority. By preference, but not as a limitation upon the practice of the invention, FB_1 is associated with a host 14 and FB_N is associated with, by example, an HDTV video source that does not provide an indication of pixel translucency, or alpha. The FBs are addressed in parallel so that each operates in lock-step with the others.

Figure 1:
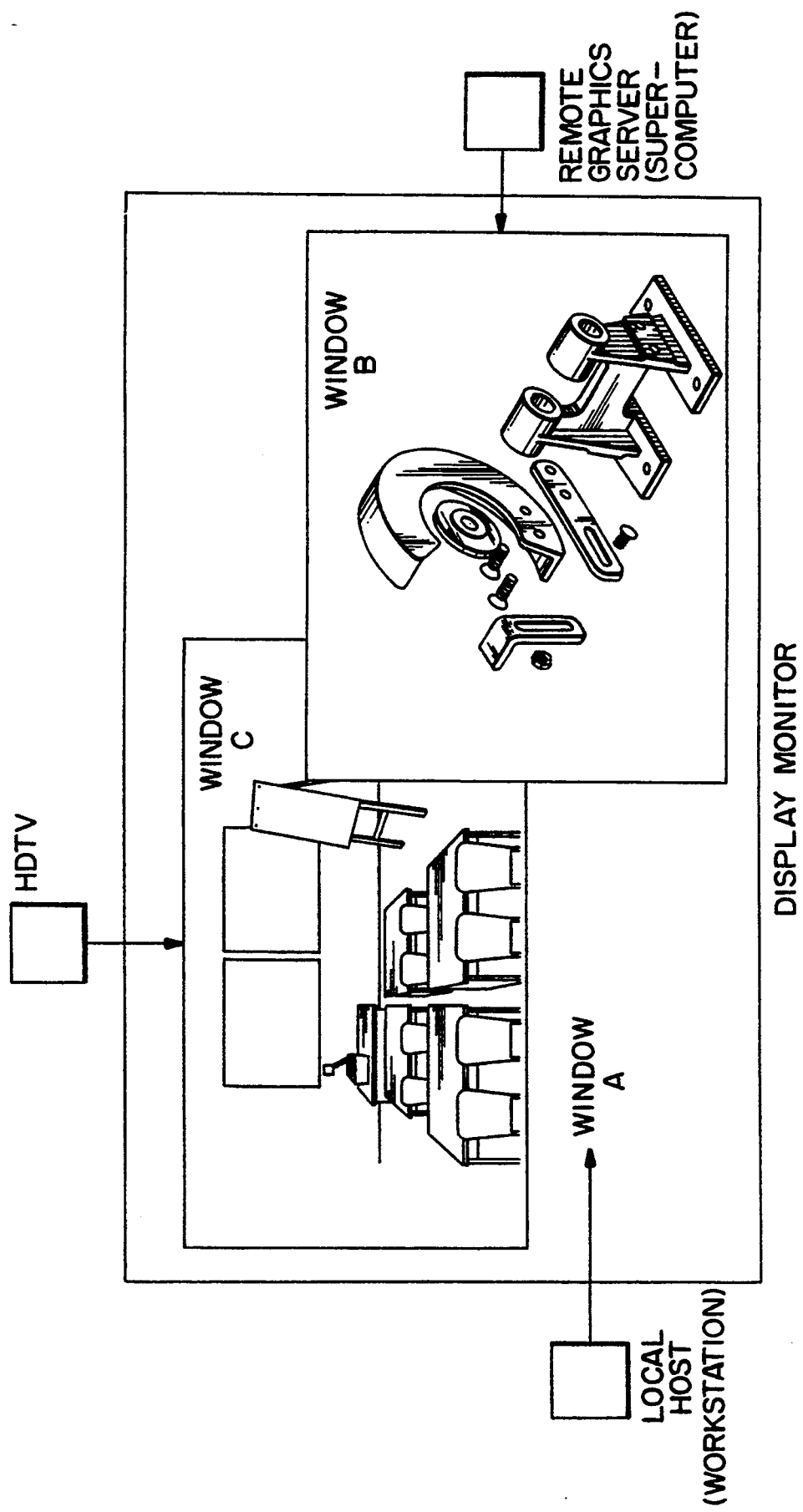
FIG. 1 illustrates an exemplary display screen having multiple video data sources each displayed within an associated window.

In a multi-media system such as the one depicted in FIG. 2 a coherency of pixel format cannot be assumed. For example, an image generated by a supercomputer and/or a graphic server and received from a communication network may have a 24-bit Red, Green, Blue (R,G,B) format. However, the local workstation host 14 may have an 8-bit pixel format, and an HDTV sampled input may have a chrominance/luminance (Y/C) format. In order to mix pixels from these diverse sources a first step converts the pixel values to a common format. In the system 10 the R, G, B format is chosen as the common format due to its relative simplicity, although other formats are within the scope of the teaching of the invention. Thus, all pixel data is converted to R, G, B. This data conversion is accomplished at each FB through the use of a Look-Up-Table (LUT) 15. That is, knowing the particular format stored within a given FB, the associated LUT 15 is programmed such that when a pixel of the format to be converted is applied to the address inputs of the LUT 15, a corresponding R,G,B value is output. Each LUT 15 is preferably coupled to the local host 14 and is programmable thereby, although fixed-content LUTs may also be employed, depending upon the application. It should be appreciated that the host 14 may also be a source of video data to one of the FBs, such as is illustrated in FIG. 1 for the data displayed within window A. As an example, if the host 14 is a workstation then alphanumeric text information may be generated by the host 14 for display.

It is further noted that for some video sources, such as a HDTV source, the video signal may be expressed in an analog format. As such, an analog-to-digital converter is employed to first convert the analog video input to a digital format suitable for storage within the FB_N.

The use of the LUT 15 pixel data format converters thus overcomes the problem of coherency of the pixel data format provided by each independent image source, in that a common pixel format is provided prior to pixel mixing.

In order to perform mixing and anti-aliasing per pixel boundary, each of the FBs includes an alpha buffer memory plane, except for the FB_N, which has no down-stream FB and, thus, no background image to mix with. The alpha buffer memory plane is accessed by the device which is also the source of the video data for the associated FB. For example, FB_2 may have a 32-bit memory plane organized as a 24-bit R, G, B plane and an 8-bit alpha plane, both of which are sourced by a graphics server over a communication network. When the graphics server renders an image it also generates an alpha value associated with each pixel rendered for the image.

As employed herein alpha is considered to be an indication of pixel translucency or transparency, and may assume values between zero and one. With alpha equal to zero the associated pixel is considered to be totally transparent. That is, any background pixel or pixels are visible. With alpha equal to one the associated pixel is considered to be totally opaque. Values between zero and one provide for gradations in pixel transparency and are employed to advantage at the boundaries of foreground and background images to anti-alias the boundary pixels to eliminate undesirable display artifacts.

The pixel data and alpha values are both transferred over the communication network into the associated FB_2. The 8-bit alpha value is used for pixel mixing, via MIX logic 16 and multiplexer (MUX) logic 17, so as to mix R,G,B image pixel data passed up from the downstream FB with the pixel from FB_2. The alpha FB plane thus enables real-time, pixel-by-pixel mixing of the foreground pixels with the background pixels. Anti-aliasing may also be accomplished in real-time, as will be described below.

In operation, the FB having the lowest priority (N) converts a pixel (x,y) to R, G, B pixel format, via the associated LUT 15, and passes the converted pixel value on for mixing with a corresponding pixel from the next highest priority frame buffer (FB_N-1), via the MIX 16. All $FB_j$, except for the N-th FB (lowest priority), may perform one of three operations. These operations are shown in TABLE 1.

TABLE 1

1. Discard the pixel passed from the j+1 FB and pass the associated pixel to the upstream j−1 FB, or to the display 12 if j=1. This is accomplished by selecting the A input of the associated MUX 17.

2. Discard its own pixel and pass the pixel received from the j+1 FB to the j−1 FB, or to the display 12 if j=1. This is accomplished by selecting the C input of the associated MUX 17.

3. Use the value of alpha, from the associated FB, to mix its own pixel value with the pixel received from the j+1 FB, and then pass the mixed pixel value to the j−1 FB, or to the display 12 if j=1. This is accomplished by selecting the B input of the associated MUX 17.

The method set forth above provides a technique where, for a given display pixel (x,y), either a single pixel (x,y) from any FB is selected (pixel switching), or any mixed result of two or more pixels (x,y), from different FBs, is selected (pixel mixing).

Figure 4:
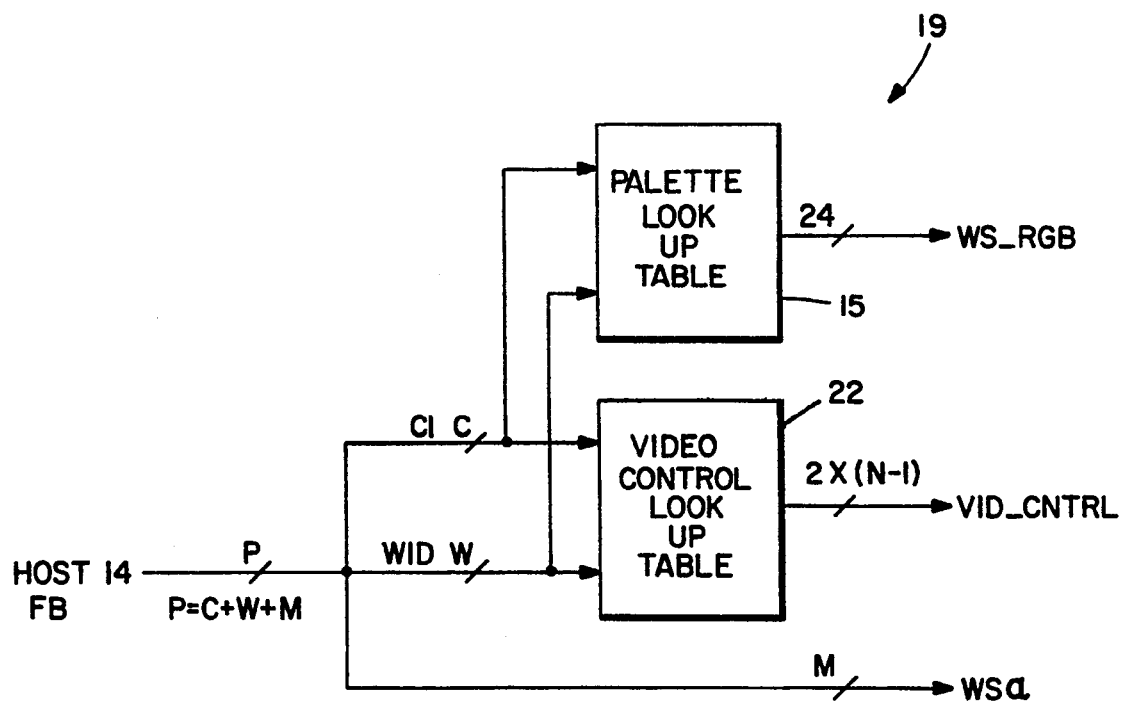
FIG. 4 illustrates a local host video path.

As seen in FIG. 4, the invention employs a color keying method based on the pixel value of the local host 14. The local host 14 FB is comprised of three planes. One plane stores a local host 14 pixel value, or color index (CI). A second plane stores a local host 14 window identification number (WID). A third plane stores a local host 14 alpha value (WS_alpha). The system 10 employs control logic 19 for generating a plurality of signals based on inputs from the host 14 FB. These inputs include a CI input for "color keying" to determine display 10 operation. WID provides a mechanism where different windows of the display 12 may have one or more key colors associated therewith. This is accomplished through the use of a palette LUT 15 and a video control (VC) LUT 22. VC_LUT 22 has 2(N−1) outputs which are provided in pairs to each of the MUXes 17 for controlling the operation thereof, in accordance with TABLE 1.

For example, for a first window a red CI may be defined as "key" to select, via the VC_LUT 22, the HDTV input. For another window a red CI may be the "key" to cause, via VC_LUT 22, the mixing of a host 14 pixel with a HDTV background pixel, using WS_alpha for modifying the values of boundary pixels so as to perform anti-aliasing. For another window, a red CI may be a pixel that is displayed on the monitor 12, via the palette LUT 15 where the CI is converted to 24-bit R,G,B format. This method advantageously enables any number of independent image sources to be coordinated, rather than being limited to only two image sources.

Furthermore, this method also provides pixel mixing for functions such as real-time anti-aliasing or image blending. All of these functions may be accomplished on pixels contained within and/or bounding an object of interest, based on the value of WID. Furthermore, these functions are applied on pixel-by-pixel basis.

Preferably, video output controls are implemented using the local host 14 FB. For illustration, FB_1 is chosen as the local host FB, but any one of the FBs may be been chosen instead. As seen in FIG. 4, for the local host 14 graphics work space there are a total of P bit planes for the FB. Of the P-bits output by these planes, C-bits are used as the color index (CI), W-bits are used as the window identificater (WID), and M-bits are used for (WS_alpha) for blending the local host 14 image with another image. Both CI and WID are employed as indexes (addresses) to the LUT 15 to provide 24 bit R, G, B data. Furthermore, these same bits are used as indexes (addresses) to VC_LUT 22 to provide the video path control bits (VID_CNTRL), which are used to coordinate the display output. The width of VID_CNTRL is a function of the total number of the image sources (N).

For each $FB_j$, where $1 \leq j < N$, two bits are required to choose one of the three operations described in TABLE 1. The definition of these two bits may be expressed as:

00—Mixing Disabled. Select Input A for MUX;
01—Mixing Disabled. Select Input C for MUX; and
1x—Mixing Enabled. Select input B for MUX.

For $FB_j$, if bit 1 (MSB) is set, mixing is enabled and the result of the mixed pixel of $FB_j$ and $FB_{j+1}$ is passed to the j−1 FB. In this case bit 0 (LSB) is ignored. If bit 1 is reset, then alpha mixing is disabled, and either the pixel value from $FB_j$ (if bit 0 is reset) or the pixel value received from $FB_{j+1}$ (if bit 0 is set) is passed to $FB_{j-1}$.

In that the FB_N can only pass its output pixel value upstream, it does not require any control bits. Thus, the total number of bits required for VID_CNTRL, for N image sources, is B=2(N−1), where B is number of bits in VID_CNTRL and N is the number of independent image sources.

The VID_CNTRL assignment for $FB_j$ are bits 2j−2 for the least significant bit and 2j−1 for the most significant bit. This provides a flexible mechanism for window control for a multi-source system. It should be noted that from the local host 14, by using the color keying, a user may cause any display pixel to be formed from a result of all corresponding pixels from all FBs. That is, the user defines a color key to represent a specific output format, and then employs that color key where a specific output is desired. Furthermore, through the use of WID the user is enabled to select the color keying as a function of window identification. For example, if the width of WID is 4-bits, then there may be up to $2^4$, or 16, windows that are simultaneously displayed and controlled. For this case the VC_LUT 22 includes up to 16 different storage regions, each region containing different VID_CNTRL values. A specific one of the regions within VC_LUT 22 is selected by the value of WID, while a specific VID_CNTRL bit combination within the region is selected by the value of CI.

In summary, this mechanism provides a flexible output control for any number of FBs utilizing both color keying and mixing (anti-aliasing) techniques on a pixel-by-pixel basis. If FB mixing is enabled for each level, the equation for the resulting displayed pixel (R) is given by:

$$R = \alpha_1 P_1 + (1-\alpha_1)(\alpha_2 P_2 + (1-\alpha_2)(\alpha_3 P_3 + (1-\alpha_3) \ldots (\alpha_{N-1} P_{N-1} + (1-\alpha_{N-1}) P_N)) \ldots),$$

where $P_j$ represents a pixel from the $FB_j$, and where $\alpha_j$ represents an alpha value from the $FB_j$.

A high resolution monitor, e.g. 2048×2048 pixels, requires a video bandwidth in excess of 360 Mhz. In order to provide the bandwidth necessary for a high resolution monitor, the serial video output from the FB VRAMs is required to be interleaved. For example, for a conventional VRAM, having a serial output bandwidth of 33 Mhz, the FB video output path needs to be, for a 60 Hz 2048×2048 resolution monitor, interleaved at least 11 ways and, thus, requires 11 independent data paths. As a further example of interleaving, for a monitor resolution of 1280×1024, the video bandwidth is 110 MHz. Thus, four way interleaving is sufficient for this resolution. However, for a monitor resolution of 2048×1536, the video bandwidth is 260 Mhz. This requires eight way interleaving, in that four way interleaving provides only 4×33 Mhz, or 132 Mhz, while eight way interleaving provides 264 MHz.

The MIX logic 16 and the MUX logic 17 for each FB is replicated to match the interleave factor. In general, there is a MIX logic 16 and a MUX logic 17 for each of the interleaved, independent data paths. Thus, if the display output of the FB is interleaved M ways for N image sources, there are ((M X N)−N) pairs of MIX and MUX logic blocks, in that the lowest priority FB level does not require mixing. This modular approach enables pixel mixing in real-time for any monitor resolution.

Figure 3:
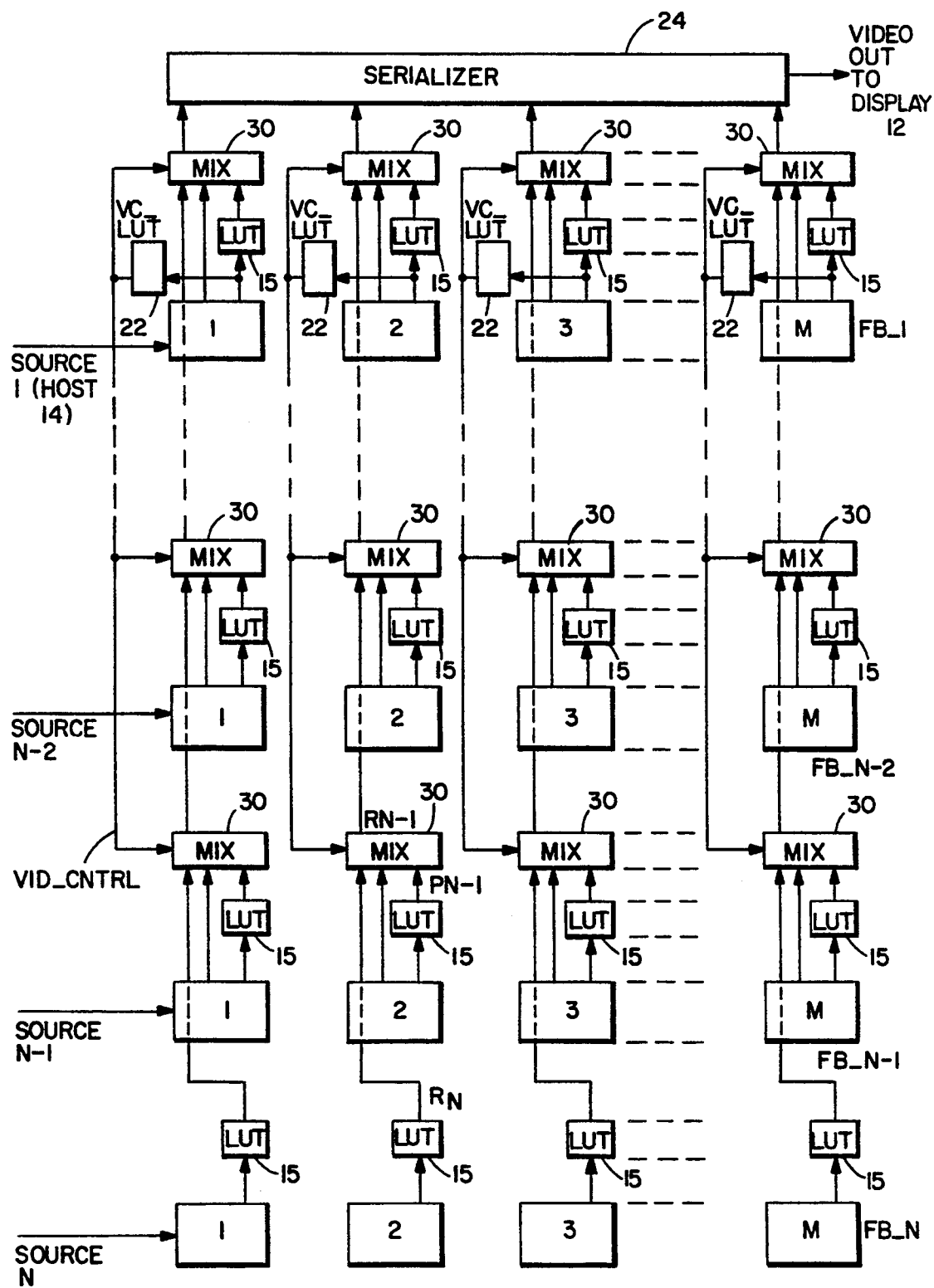
FIG. 3 is a block diagram showing an N by M configuration of hierarchically arranged frame buffers having look-up tables, pixel mixing, and pixel multiplexing circuitry interposed between frame buffers.

FIG. 3 shows a M X N embodiment for an interleaved video system. A Serializer 24 accepts the outputs from j=1 MIXERS 30 and shifts these outputs out to the display 12 at the video clock rate.

An integrated circuit implementation of the foregoing may be accomplished by several methods. One method is to provide a fast integrated circuit device after serializing the interleaved video data output from the FB VRAM's. However, this requires, for 260 Mhz display, a 3.85 nanosecond cycle time to perform any operation, such as blending two images. Another method is to provide multiple, slower devices at the output of each interleaved memory data path, as in FIG. 3. The second method is preferred over the first in that the first requires either ECL or GaAs gate arrays to accommodate the high video bandwidth. However, the same circuit architecture described below lends itself to either approach.

A most time critical section of the video data path flow is the blending function, in that this function requires multipliers and adders. The blending function for the FB, uses the equation:

$$R_j = (\alpha_j P_j) + ((1-\alpha_j) R_{j+1}),$$

where $R_j$ is the resulting pixel value output to the next FB, $P_j$ is the pixel from the $FB_j$, $R_{j+1}$ is the pixel value input from the previous $FB_{j+1}$, and $\alpha_j$ is the $P_j/(P_j+R_{j+1})$ pixel weight wherein ($0 \leq \alpha \leq 1.0$). This approach requires two multipliers and an adder. However, using an algebraic manipulation there is obtained, $$R_j = (\alpha_j P_j) + ((1-\alpha_j) R_{j+1}),$$

$$R_j = (\alpha_j P_j) + R_{j+1} - (\alpha_j R_{j+1}), \text{ and}$$

$$R_j = (\alpha_j(P_j - R_{j+1})) + R_{j+1}.$$

This latter expression for $R_j$ requires but one multiplier and two adders.

Figure 5:
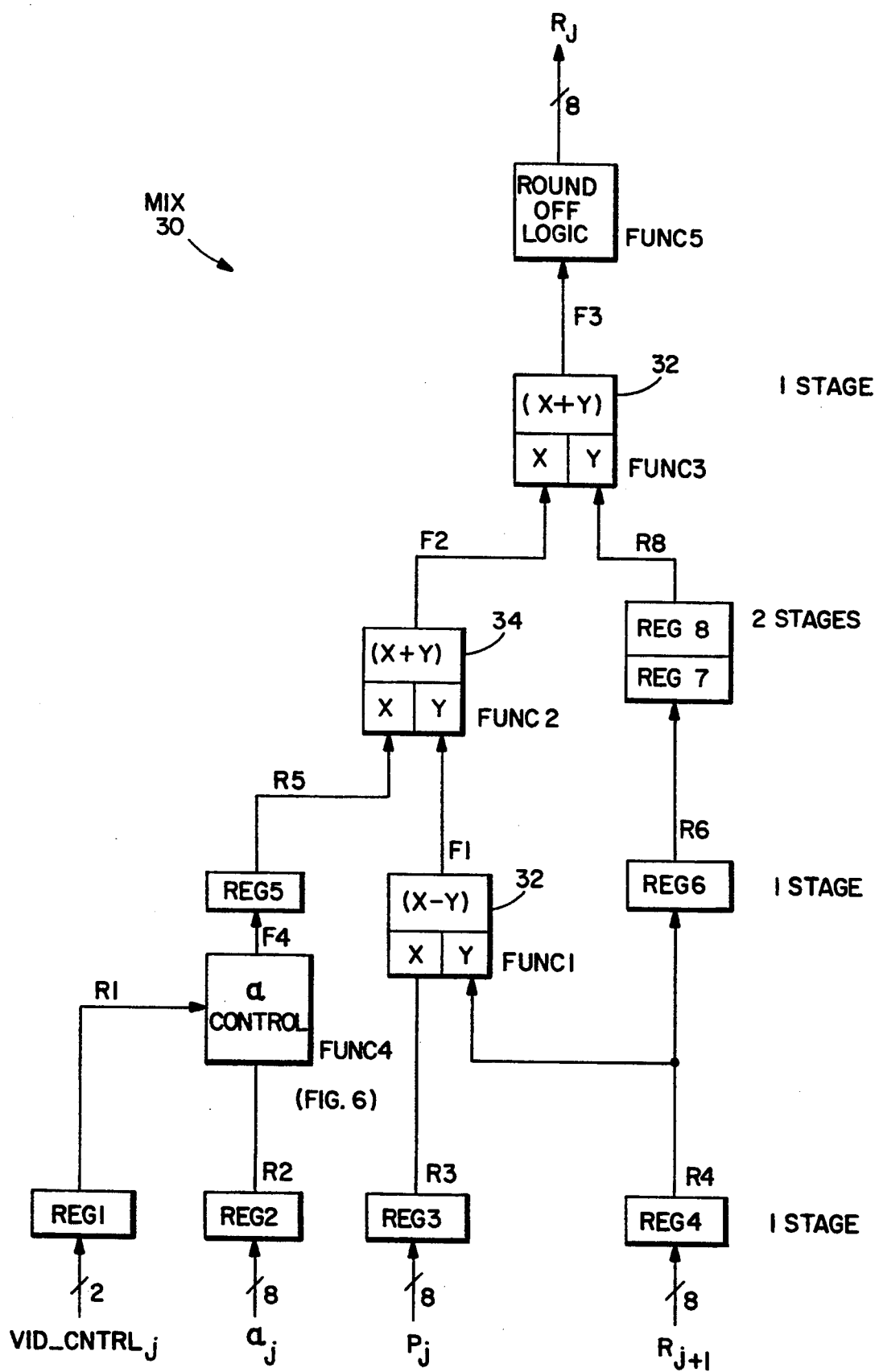
FIG. 5 is a block diagram illustrating pixel mixing and multiplexing logic embodied within an integrated circuit device.

FIG. 5 illustrates a mixer integrated circuit device 30 block diagram. Because of the required cycle time, the adders 32 and the multiplier 34 are pipelined, and all data values are delayed to maintain them in synchronous order, as will be described.

The following describes the function of the MIXER 30 of FIG. 5. Reference is also made to FIG. 3. The image data associated with each pixel arrives at the inputs simultaneously. In order to provide a maximum clock speed all inputs and outputs are registered (REG-1-REG8) and clocked by the system clock.

The system clock is derived by dividing the video bandwidth by M for an M-way interleaved memory. For example, in the case of a medium resolution monitor, the video bandwidth is 110 MHz. The FB memory is interleaved, by example, four ways. Therefore, the system clock is 110 Mhz/4, or 27.5 Mhz. In case of the high resolution monitor, the video bandwidth is 260 Mhz and the memory is interleaved eight ways. Thus, the system clock is 260 Mhz/8, or 32.5 Mhz.

In that it is difficult to economically achieve a full multiplier that operates at approximately 33 Mhz, the multiplier 34 is preferably pipelined. The depth of the pipelining depends on the selected chip technology. Using readily available integrated circuit technology the multiplier pipeline depth may be achieved with two stages, and the adder 34 achieved with one stage. To maximize the throughput, the output of each functional block is reclocked. Thus, the MIXER 30 is totally synchronous with a single free running system clock.

The function of the MIXER 30 is described as follows. All inputs are simultaneously clocked into the chip registers REG1 through REG4. These inputs are VID_CNTRL$_j$, $\alpha_j$, $P_j$ and $R_{j+1}$. The output of REG3 and REG4 are fed into function block FUNC1 where the (R3-R4) operation is performed. Meanwhile, to synchronize all other inputs, R1, R2, and R4 are delayed via registers REG5 and REG6. The function of (FUNC4) is discussed later. For the next two clock cycles, R5 and F1 are multiplied by FUNC2, and R6 is correspondingly delayed two clock cycles with REG7 and REG8. Finally, F2 and R8 are fed through the function block FUNC3 where the (F2+R8) operation is performed.

In order to obtain perfect mixing across N frame buffers, the full precision of $R_j$, which increases by the width of $P_j$ at each $FB_j$, should be propagated. However, this is not a practical solution in that it is not cost effective to carry the full resolution of $R_j$ to the next stage. However, a simple truncation may be used and results in, on the average, a ½ bit error per mixing stage.

If rounding off is performed at the function block FUNC5 then, on average, the error is ¼ bit, or one half of the ½ bit error if FUNC5 were not employed. Thus, FUNC5 provides that the resulting pixel $R_j$ has the same number of bits as $P_j$. Therefore, the total cycle time required for MIXER 30 is six system clock periods.

MIXER 30 serves two functions. The first function is alpha mixing (or anti-aliasing). The second function is data path control. As shown in FIG. 2, for each FB, except the FB_N, there is provided a three-to-one MUX 17. To further reduce cost and complexity the function of MUX 17 is incorporated within MIXER 30, as described below.

Figure 6:
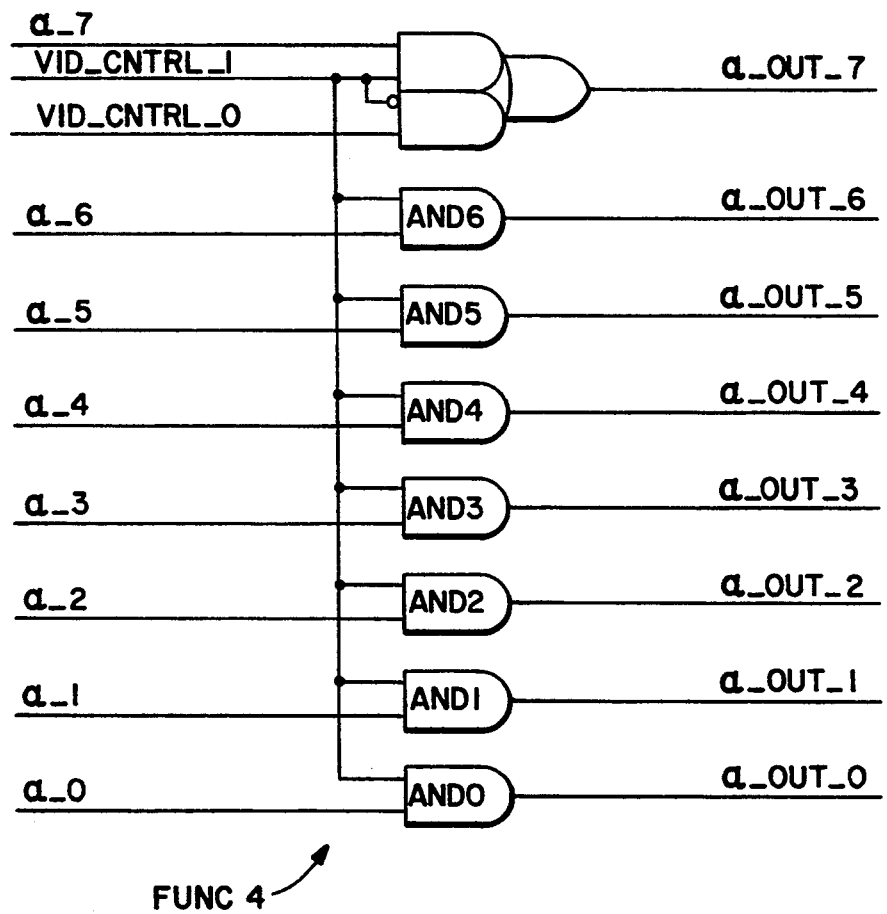
FIG. 6 is a schematic diagram illustrating an alpha control logic function from the pixel mixing logic of FIG. 5.

When alpha is set to 1.0, $R_j$ (the result of alpha mixing) is $P_j$. When alpha is set to 0.0, then $R_j$ is $R_{j-1}$. In other words, the mixing function may also perform a multiplexer function, provided that the values of alpha are properly selected. This is accomplished in the block (FUNC4), as shown in FIG. 5. The logic for FUNC4, for an 8-bit wide alpha value, is shown in FIG. 6. The two bit VIDEO_CNTRL is employed to control the alpha value. When the alpha enable bit (VID_CN-TROL_1) is asserted, then alpha-OUT is identical to the alpha input. When the alpha enable bit (VID_CNT-RL_1) is deasserted, alpha_OUT_0 to alpha_OUT_6 are forced to a zero by AND6 through AND0. Furthermore, alpha _OUT_7 is set to a one, making alpha_OUT=1.0, which causes the MIXER 30 to select $P_{j+1}$.

The total number of inputs and outputs to MIXER 30, assuming an 8-bit alpha value, are
for each R,G,B color:
    8 outputs for $R_j$;
    8 inputs for $P_j$;
    8 inputs for $R_{j+1}$;
common signals
    8 inputs for alpha;
    2 inputs for VID_CNTRL; and
    1 input for SYSTEM CLOCK,
for a total of 83 pins, not including power, etc.

As was stated, one of the problems encountered with pixel mixing is that two images, generated from two different sources, may be different in format. For example, pixel sizes may be different between two images sources, where one image source pixel may be a square pixel while the other image source pixel is not a square pixel. Another example is that two image sources may not have the same resolution. Thus, in order to have a pixel-by-pixel correspondence for the entire FB structure, one image may need to be either scaled up, if that image source is smaller than the other, or scaled down, if that image source is larger than the other. One solution to these problems, which is accommodated by the teaching of the invention, is to over-sample on all of the FBs where the resolution of the image source for the FB is a common least multiple of the resolution of each of the image sources, in both the horizontal and vertical directions. The common least multiple FB approach is preferable, in that over-sampling is not always readily accomplished, as in the case of an HDTV image sampler in which the resolution is fixed at 1920×1035 pixels. However, if the FB size is the size of a least common multiple, then pixels may be either simply replicated or interpolated as a means for over-sampling. Another approach is to employ digital signal processing in order to over-sample.

It should be noted however that the least common multiple approach may result in a very large FB. For example, the least common multiple of 480 scanlines and 1035 scanlines is 33,120 scanlines. Furthermore, the resulting pixel may not be a square pixel. Also, a time-base correction may be necessary to match the monitor bandwidth.

Fortunately, for many graphics or video systems the pixels are normally square (or almost square). Furthermore, due to windowing, image sources need not fill the entire FB, so that each pixel can be treated equally. Thus, pixel $P(x,y)_j$ may be considered as being both square and equal in size for all $j$ $1 \leq j \leq N$), where $j$ represents the j-th FB and N is the number of frame buffers in the system.

In summary, the invention addresses and solves the problems of combining multiple image sources at a display monitor. Overlay and blending techniques are disclosed for a system with N independent image sources.

The technique of the invention allows for any number of independent image sources (N), where each source has an associated FB. The architecture also enables the serial output of each FB to be interleaved so as to match the video output. Thus, if the interleaving requires M arrays, then the total number of MIXERS 30 is N×M, which enables mixing of any number of images with a pixel accuracy that is a function of the combined transparency coefficient of the images.

The teaching of the invention also employs video look-up tables to enable a variety of mixing operations to occur in a multi-tasking environment, based on an application specific window identification number.

The invention also provides real-time pixel switching and control on a pixel-by-pixel basis, for any number of independent image sources per window, using the WID value.

While the invention has been particularly shown and described with respect to preferred embodiments thereof, it will be understood by those skilled in the art that changes in form and details may be made therein without departing from the scope and spirit of the invention.

Having thus described our invention, what we claim as new, and desire to secure by Letters Patent is:

1. Image display apparatus, comprising:
   a plurality of frame buffer means organized in a hierarchical manner so as to provide a highest priority frame buffer means and a plurality of lower priority frame buffer means, each of said frame buffer means storing image pixel data received from an associated image source;
   means, coupled to an output of each of said frame buffer means, for converting a display format of the stored image pixel data to a predetermined display format; and
   means, having inputs coupled to individual ones of said converting means outputs, for selectively combining an image pixel from each of said plurality of frame buffer means so as to form a composite image pixel, wherein said combining means includes a plurality of means, individual ones of which are interposed between two hierarchically adjacent ones of said frame buffer means, for selectively generating an image pixel value and for providing the generated image pixel value to an input of a generating means at a next highest level, said generating means being responsive to a control means for selectively providing one of (a) an image pixel value that is equal to an image pixel value output by a first one of the hierarchically adjacent ones of the frame buffer means, (b) an image pixel value that is equal to an image pixel value output by a second one of the hierarchically adjacent ones of the frame buffer means, and (c) an image pixel value that is equal to a combination of the image pixel values output by each of the first and the second hierarchically adjacent ones of the frame buffer means, the combined image pixel value being a function of a pixel transparency value associated with a pixel from one of the hierarchically adjacent ones of the frame buffer means, wherein each of said generating means includes mixer means for mixing together, in accordance with a pixel transparency value provided by the associated frame buffer means, a pixel value from the associated frame buffer means and a pixel value received from a next lower priority level, and wherein said mixer means includes first means for subtracting the converted pixel value output by the associated frame buffer means from the pixel value received from the mixer means associated with the frame buffer means at the next lower priority level, second means for multiplying a difference value output by said first means times a transparency value associated with the pixel value output by the associated frame buffer means, and third means for adding a product value output by said second means to the pixel value received from the mixer means associated with the frame buffer means at the next lower priority level.

2. Image display apparatus as set forth in claim 1 wherein each of said generating means further includes multiplexer means having a plurality of inputs, wherein one of said inputs is coupled to an output of said mixer means, one of said inputs is coupled to the output of the associated converting means, and one of said inputs is coupled to an output of the mixer means associated with the frame buffer means at the next priority level, said multiplexer means being responsive to a signal generated by said control means for selectively providing at an output a value corresponding to one of said three inputs.

3. Image display apparatus as set forth in claim 2 wherein said control means includes look-up table means for generating said control signal on a pixel-by-pixel basis in accordance with a pixel color code and a display means window identifier.

4. Image display apparatus as set forth in claim 3 wherein said pixel color code and said display screen window identifier are stored within one of said frame buffer means that is associated with said control means.

5. Image display apparatus as set forth in claim 4 wherein said frame buffer means that is associated with said control means is a highest priority frame buffer means.

6. Image display apparatus as set forth in claim 5 wherein the output of said multiplexer means, that is associated with said highest priority frame buffer means, is coupled to said display means.

7. Image display apparatus as set forth in claim 1 wherein at least one of said converting means is programmable and has an input coupled to control means for having data, representing the predetermined format, stored within under the control of the control means.

8. A method for generating video pixel data, comprising the steps of:

providing a plurality of frame buffer means organized in a hierarchical manner so as to provide a highest priority frame buffer means and a plurality of lower priority frame buffer means, each of said frame buffer means storing image pixel data from an associated image pixel source; and at each level of the hierarchy of frame buffer means other than a lowest level, selecting as an output of that level one of, a) a first image pixel value that is equal to an image pixel value that is output from the frame buffer means associated with that level, b) a second image pixel value that is output from the adjacent, lower level of the hierarchy of frame buffer means, and c) a third image pixel value that is a combination of the image pixel value that is output from the frame buffer means associated with that level and the image pixel value that is output from the adjacent, lower level of the hierarchy of frame buffer means, wherein the combination is made in accordance with a transparency value that is associated with the image pixel value that is output from the frame buffer means associated with that level, wherein the step of selecting the third image pixel value includes a step of mixing together, in accordance with the transparency value provided by the associated frame buffer means, a pixel value from the associated frame buffer means and a pixel value received from the adjacent, lower priority frame buffer means, and wherein the step of mixing together includes the steps of, subtracting the pixel value output by the associated frame buffer means from the pixel value received from the frame buffer means at the next lower priority level;

multiplying a difference value that results from the step of subtracting times the pixel transparency value associated with the pixel value output by the associated frame buffer means; and adding a product value that results from the step of multiplying to the pixel value received from the frame buffer means at the next lower priority level.

9. A method as set forth in claim 8 wherein the step of selecting is executed on a pixel-by-pixel basis for each image pixel stored within each of the frame buffer means.

10. A method as set forth in claim 8 wherein the step of selecting includes the steps of decoding a predetermined pixel color value in conjunction with a display window identifier so as to generate a plurality of control signals for controlling the selection of image pixel values.

11. A method as set forth in claim 10 wherein the predetermined pixel color value and the display window identifier are stored within a highest priority frame buffer means.

12. A method as set forth in claim 8 wherein the step of selecting includes a step of converting a display format of a stored image pixel data to a predetermined display format.

13. An integrated circuit device for processing image pixel data, said integrated circuit device comprising a first input port for coupling to an output of a first source of image pixel values, a second input port for coupling to an output of a second source of image pixel values, and a third input port for coupling to an output of a source of image pixel transparency values that are associated with the image pixel values output from the first source, said integrated circuit device further comprising means, responsive to a predetermined state of a control signal applied to a control input port, for selectively mixing together image pixel values received from said first input port and from said second input port, said means for selectively mixing comprising first means for subtracting an image pixel value received from the first input port from an image pixel value received from the second input port, second means for multiplying a difference value output from said first means times an image pixel transparency value received from the third input port, and third means for adding a product value output from said second means to the image pixel value received from the second input port, said integrated circuit device further comprising an output port, coupled to an output of said third means, for outputting a resultant image pixel value.

14. An integrated circuit device as set forth in claim 13 and further comprising means for delaying an image pixel value received from the second input port by an amount of time required for the operation of the first and second means, said delaying means having an output coupled to said third means for providing the delayed image pixel value thereto for adding to the product value that is output from said second means.

15. Image display apparatus, comprising:
a plurality of frame buffer means organized in a hierarchical manner so as to provide a highest priority frame buffer means and a plurality of lower priority frame buffer means, each of said frame buffer means storing image pixel data from an associated source; and
means, interposed between hierarchically adjacent frame buffer means, for selecting an image pixel value and for providing the selected image pixel value to an input of another selecting means at a next highest level, said selecting means being responsive to control signals for selecting as an output at each level one of,
a) an image pixel value that is equal to an image pixel that is output from the frame buffer means associated with that level,
b) an image pixel value that is output from the adjacent, lower level of the hierarchy of frame buffer means, and
c) an image pixel value that is a combination of the image pixel value that is output from the frame buffer means associated with that level and the image pixel value that is output from the adjacent, lower level of the hierarchy of frame buffer means, wherein the combination is made in accordance with a transparency value that is associated with the image pixel value that is output from the frame buffer means associated with that level, wherein
said selecting means includes first means for subtracting the pixel value output by the associated frame buffer means from the pixel value received from the selecting means associated with the frame buffer means at the next lower priority level, second means for multiplying a difference value output by said first means times the transparency value associated with the pixel value output by the associated frame buffer means, and third means for adding a product value output by said second means to the pixel value received from the selecting means associated with the frame buffer means at the next lower priority level.

16. Image display apparatus as set forth in claim 15 and further including means, coupled to an output of each of said plurality of frame buffer means, for converting a format of the stored image pixel data to a predetermined format.

17. Image display apparatus as set forth in claim 16 wherein the predetermined format is R,G,B.

18. Image display apparatus as set forth in claim 15 wherein said control signals are generated by control means that includes look-up table means for generating the control signals on a pixel-by-pixel basis in accordance with a pixel color code and a display means window identifier, wherein said pixel color code and said display screen window identifier are stored within one of said frame buffer means that is associated with said control means.

* * * * *

UNITED STATES PATENT AND TRADEMARK OFFICE
CERTIFICATE OF CORRECTION

PATENT NO. : 5,351,067
DATED : 9/27/94
INVENTOR(S) : Lumelsky et al.

It is certified that error appears in the above-identified patent and that said Letters Patent is hereby corrected as shown below:

In column 12, line 41, after "priority" insert --level--,

In column 14, line 4, after "pixel" insert --value--.

Signed and Sealed this

Thirteenth Day of December, 1994

Attest:

BRUCE LEHMAN

Attesting Officer     Commissioner of Patents and Trademarks